US011485010B2

(12) United States Patent
Zimmer et al.

(10) Patent No.: US 11,485,010 B2
(45) Date of Patent: Nov. 1, 2022

(54) ADAPTER SYSTEM FOR CONNECTING THE LAST ELEMENT OF A KINEMATIC CHAIN TO A HANDLING DEVICE (71) Applicants: Günther Zimmer, Rheinau (DE); Martin Zimmer, Rheinau (DE)

(72) Inventors: Günther Zimmer, Rheinau (DE); Martin Zimmer, Rheinau (DE)

(*) Notice: Subject to any disclaimer, the term of this patent is extended or adjusted under 35 U.S.C. 154(b) by 351 days.

(21) Appl. No.: 16/754,405

(22) PCT Filed: Oct. 9, 2018

(86) PCT No.: PCT/DE2018/000287
§ 371 (c)(1),
(2) Date: May 28, 2020

(87) PCT Pub. No.: WO2019/072330
PCT Pub. Date: Apr. 18, 2019

(65) Prior Publication Data
US 2021/0197363 A1 Jul. 1, 2021

(30) Foreign Application Priority Data

Oct. 9, 2017 (DE) .................... 10 2017 009 319.9

(51) Int. Cl.
*B25J 15/04* (2006.01)
*B25J 9/08* (2006.01)
(Continued)

(52) U.S. Cl.
CPC ............ *B25J 9/08* (2013.01); *B25J 15/0408* (2013.01); *B25J 9/06* (2013.01); *B25J 9/126* (2013.01)

(58) Field of Classification Search
CPC ... B25J 9/08; B25J 9/06; B25J 15/0408; B25J 15/0475; B25J 15/0491; B25J 15/08
(Continued)

(56) References Cited

U.S. PATENT DOCUMENTS 4,664,588 A * 5/1987 Newell ............... B23Q 1/0063
414/730
7,748,761 B2 * 7/2010 Simons ............... B25J 15/0206
294/2
(Continued)

FOREIGN PATENT DOCUMENTS

DE 102015012779 A1 4/2017
EP 3135443 A1 3/2017

OTHER PUBLICATIONS

Zimmer Group, Handling Technology construction kit for YASKAWA—Robots, Oct. 6, 2017, retrieved from http://www.zimmer-group.de/downloads/hht/mkt000062-01_br-hht-yaskawa-sen-ain-v2.pdf on Apr. 7, 2020.

*Primary Examiner* — Paul T Chin
(74) *Attorney, Agent, or Firm* — Smartpat PLC (57) ABSTRACT An adapter system for connecting the last element of a kinematic chain of a handling device to same, wherein the last element has a computer-storage module, as well as at least one actuator and/or at least one sensor. At least three sequentially positioned system modules are arranged between the penultimate and the last element. A first system module is a mechanical module, via which electrical and/or pneumatic connection lines are guided. In a second system module, the connection lines are connected with transition points of a negative adapter geometry of a mechatronic combi-interface. At least one further system module is arranged in a couplable manner between the second system module and the last element. A third system module has an electronics assembly which adapts the predefined system architecture to the device interface of the last element.

8 Claims, 4 Drawing Sheets (51) Int. Cl.
  *B25J 9/06* (2006.01)
  *B25J 9/12* (2006.01)

(58) Field of Classification Search
  USPC .................................................. 294/213, 106
  See application file for complete search history.

(56) References Cited

U.S. PATENT DOCUMENTS

| | | | |
|---|---|---|---|
| 8,186,733 B2* | 5/2012 | Geary | B25J 15/0253 |
| | | | 294/207 |
| 8,573,662 B2* | 11/2013 | Thiel | H01F 7/0257 |
| | | | 294/907 |
| 9,757,863 B2* | 9/2017 | Suzuki | B25J 15/0425 |
| 10,065,327 B1* | 9/2018 | Chen | B25J 15/0408 |
| 2005/0065647 A1 | 3/2005 | Perry et al. | |
| 2013/0012053 A1* | 1/2013 | Sirkett | B25J 19/0029 |
| | | | 439/460 |
| 2016/0167236 A1* | 6/2016 | Kato | B25J 15/0408 |
| | | | 294/213 |
| 2017/0057085 A1 | 3/2017 | Cookson et al. | |
| 2018/0370026 A1* | 12/2018 | Reese | B25J 15/00 |
| 2020/0061847 A1* | 2/2020 | Dixon | A61B 34/30 |
| 2020/0078939 A1* | 3/2020 | Jeong | B25J 9/1697 |
| 2020/0108497 A1* | 4/2020 | Miyazaki | B25J 15/045 |
| 2020/0122343 A1* | 4/2020 | Oikawa | B25J 17/025 |
| 2020/0276719 A1* | 9/2020 | Buind | B25J 15/0019 |
| 2021/0016404 A1* | 1/2021 | Ulrich | B23Q 7/1431 |

* cited by examiner

Fig. 1

ADAPTER SYSTEM FOR CONNECTING THE LAST ELEMENT OF A KINEMATIC CHAIN TO A HANDLING DEVICE

TECHNICAL FIELD

The disclosure relates to an adapter system for connecting the last element of a kinematic chain of a handling device to same, wherein the last element comprises a computer-storage module as well as at least one actuator and/or at least one sensor. In combination with the last element, the handling device is, for example, a multi-section 6-axis robot that carries a parallel gripper.

BACKGROUND

A parallel gripper for mechanical gripping of workpieces is known from DE 10 2015 012 779 A1. The gripper arms of the gripper are driven by an electromechanical drive. The drive motor located in the gripper housing is controlled by a programmable logic controller arranged remotely from the gripping device. A data interface for point-to-point communication with the programmable logic controller is located in the gripper housing. Furthermore, at least one computer-storage unit for the application software of the gripper and a servo controller are placed in the gripper housing. The latter has a closed cascade controller, the control of the drive motor and an encoder interface for a rotary encoder.

As a rule, such an intelligent actuator also has intelligent sensors. The individual sensor consists of a core sensor, evaluation electronics and at least one communication interface. Each of the actuator and the sensors has an interface that typically has to be integrated into an existing system architecture in the automation environment of the handling device. Within the architecture, various hardware platforms run through more or less harmonized automation levels, ranging from the sensor and/or actuator bus via the field bus and the factory bus up to the control level.

SUMMARY

The present invention is based on the problem of creating an adapter system for connecting the last element of a kinematic chain of a handling device to the handling device, with which the last element of the kinematic chain equipped with actuators and sensors can be integrated into any system architecture of the controlling and regulating background software and hardware.

This problem is solved with the features of the main claim. Thereby, at least three sequentially positioned system modules are arranged between the penultimate and the last element of the kinematic chain. A first system module is a mechanical module mechanically adapted to the penultimate element, through which electrical and/or pneumatic connection lines are routed. In a second system module, the electrical and/or pneumatic connection lines are connected to transition points of a negative adapter geometry of a mechatronic combi-interface. At least one further system module is arranged between the second system module and the last element, wherein this system module, like each further system module, has a positive adapter geometry for connection to a previous system module and at least one negative adapter geometry for connection to a subsequent system module. In the individual combi-interface, the contacting negative and positive adapter geometries are designed to be complementary to one another. The negative and the positive adapter geometries can be connected to one another by means of a coupling device in a manner that is torsion-proof and captive, and dimensionally stable. A third system module has an electronics assembly that adapts or converts the communication data to be exchanged with the predefined system architecture of the incoming electrical connection lines for communication with the device interface of the last element, and makes it available in a communicable form via the corresponding transition points of the negative adapter geometry.

The individual system modules are arranged in several layers one behind the other and can be interchanged in the sequence as required.

Since an IO-link master for four ports is installed in the communication module, it is possible to provide a system module with several branches. Thereby, this system module has a positive adapter geometry on its upper side and two to four negative adapter geometries in its lower area. The connection planes of the negative adapter geometries can, for example, lie next to one another or on a circle in one plane. In another embodiment, the normal of the connection planes are, for example, on a cone surface.

DETAILED DESCRIPTION

Figure 1:
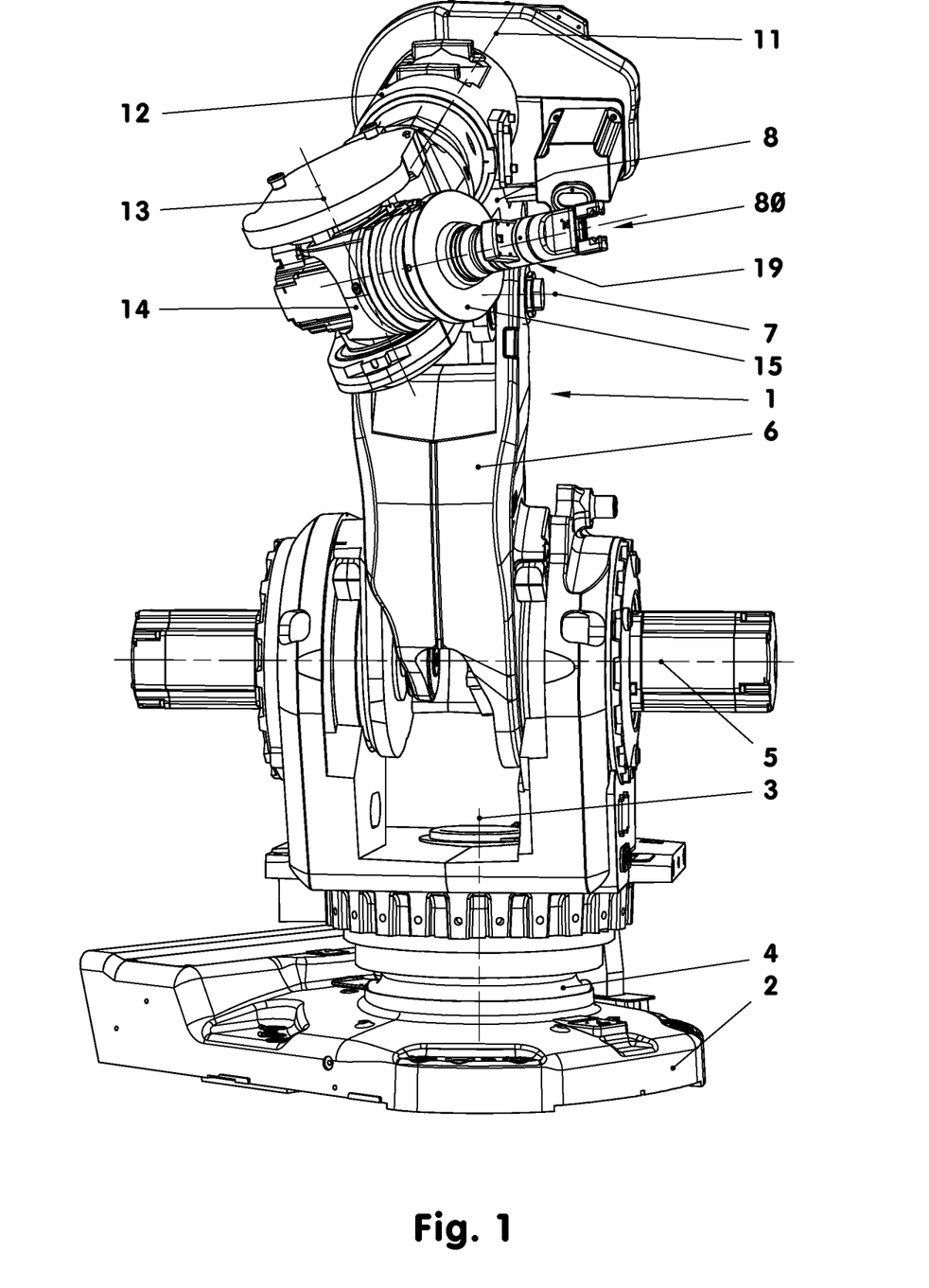
FIG. 1 is a perspective view of a handling device with a gripper adapted via an adapter system.

FIG. 1 shows a handling device (1) designed as an articulated robot with so-called "RRR kinematics." The serial kinematic structure of the articulated robot (1) has three main rotational axes and three secondary rotational axes. The main axes are the A-axis (3), the B-axis (5) and the C-axis (7). The A-axis (3) is a turntable (4) with a vertical rotational axis, which is mounted on the base plate (2) of the handling device. The turntable (4) is the first kinematic chain link to support a foot lever (6) that can be swiveled around the horizontal B-axis (5)—by, for example, 210 angular degrees. At the free end of the foot lever (6), the C-axis (7), which supports the toggle lever (8), is located as a joint with a likewise horizontal pivot axis. The toggle lever (8) can be swiveled by, for example, 270 angular degrees in relation to the foot lever (6).

The first secondary axis, the D-axis (11), is a rotational axis. It consists of a support arm (12) rotatable about its longitudinal axis, which is mounted at the free end of the toggle lever (8). The second secondary axis is the E-axis (13), around which the hand lever (14) is mounted so that it can swivel by, for example, 270 degrees. The hand lever (14) carries a turntable that can be swiveled through 360 angular degrees and is mounted so that it can rotate about the F-axis (16). The turntable is the penultimate element (15) of the kinematic chain. The adapter system (19) together with the gripper (80) is fastened to it.

Through an appropriately coordinated control of the individual axes (3, 5, 7, 11, 13, 16), almost any straight path or bent path curve in the working area of the articulated robot (10) can be traversed. This can also be realized with handling devices based on a cartesian, a cylindrical or a polar robot. The robots then have corresponding TTT, RTT or RRT kinematics. "T" stands for translational and "R" stands for rotational main axes or guides, as the case may be.

In place of such robots, a handling device can also be used, which has a parallel or hybrid structure instead of the serial structure. Tripods, pentapods or hexapods can be used as parallel structures.

Figures 2, 3:
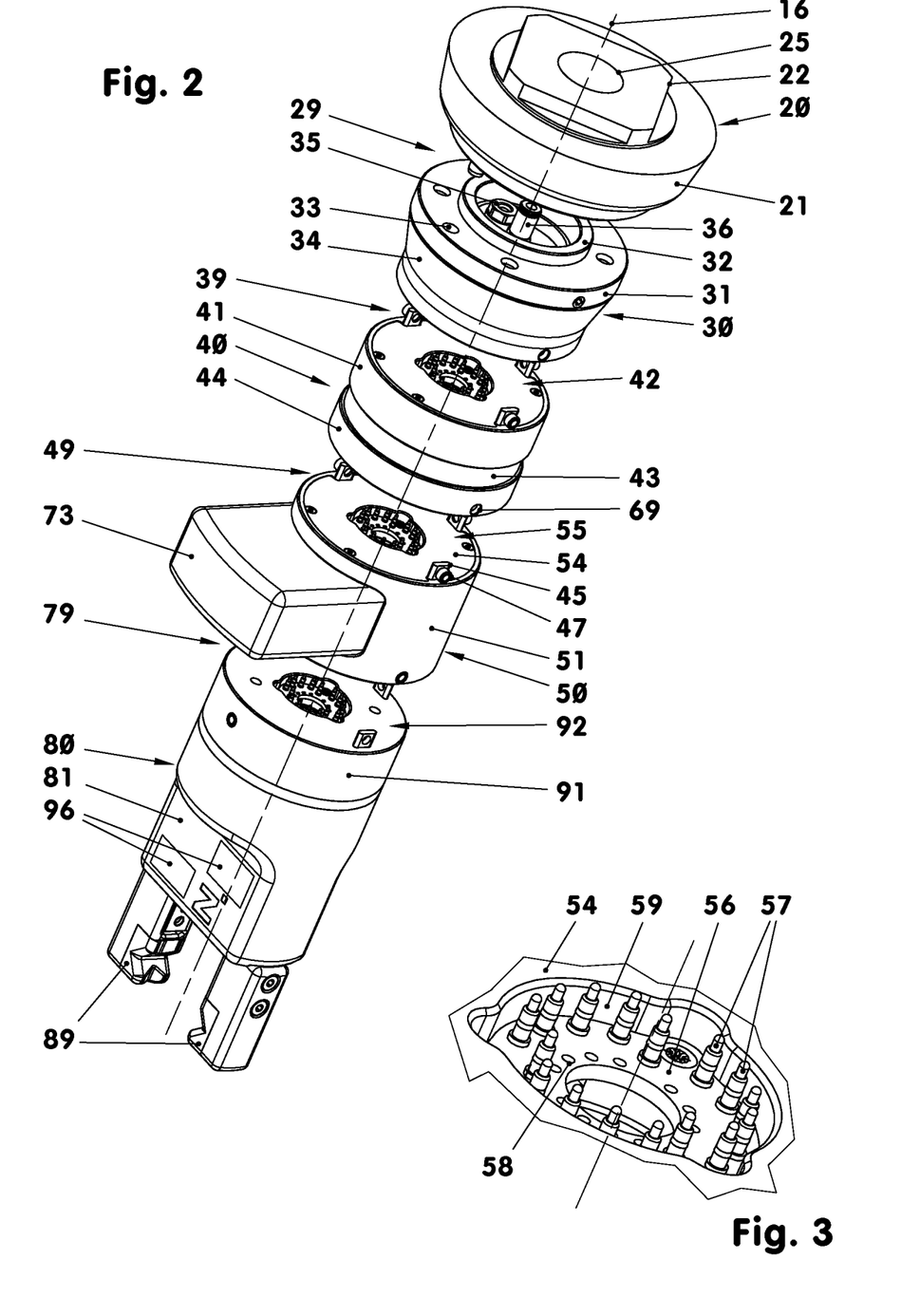
FIG. 2 is a perspective exploded view of the adapter system together with the gripper according to FIG. 1 obliquely from above.
FIG. 3 is an enlarged view of the positive adapter element of the combi-interface.

FIG. 2 shows a perspective exploded view of the adapter system (19) together with a gripper (80) from an oblique top view. In the exemplary embodiment, the adapter system (19) comprises four modules arranged one behind the other. These are, in order, a mechanical module (20), a connection module (30), a deformation module (40) and a communication module (50).

The mechanical module (20) has a base module housing (21) which has a truncated cone shape at least in some areas and by means of which it is rigidly fastened to the turntable (15). For this purpose, the base module housing (21) has a large square pin (22) on its upper side, which engages in a corresponding recess in the rotary plate (15) in a positive-locking manner. According to FIG. 4, the mechanical module (20) has a large centering countersink (23) in its lower side. A centering pin (24) is arranged between the outer edge of the base module housing (21) and the centering countersink (23) in order to prevent rotation relative to an attachable follower module. The upper and lower sides of the base module housing (21) are connected to one another by a central through bore (25). A pneumatic hose and a cable bundle consisting of a large number of cores and strands is fed through the through bore (25), which is not shown here.

The mechanical module (20) forms a mechanical interface (29) with the follower module, the connection module (30). The connection module (30) has a connection housing (31) that is also in a truncated cone shape in some areas. Here as well, as with the base module housing (21), the larger diameter of the connection housing (31) is oriented towards the turntable (15). According to FIG. 2, the upper side of the connection housing (31) has a raised circumferential centering collar (32), in the inside of which there is a larger recess. In the center of the recess, there is an inlet pipe (36) for the supply of compressed air. To the left of the inlet pipe (36), there is a cable clamp (35), by means of which the aforementioned cable bundle is locked in the mechanical module (20) in a tension-proof manner.

A locating pin bore (33) is arranged between the outer edge of the connection housing (31) and the centering collar (32); into this, the centering pin (24) of the mechanics module (20) projects in a centering manner when the mechanics interface (29) is produced.

Figures 4, 5:
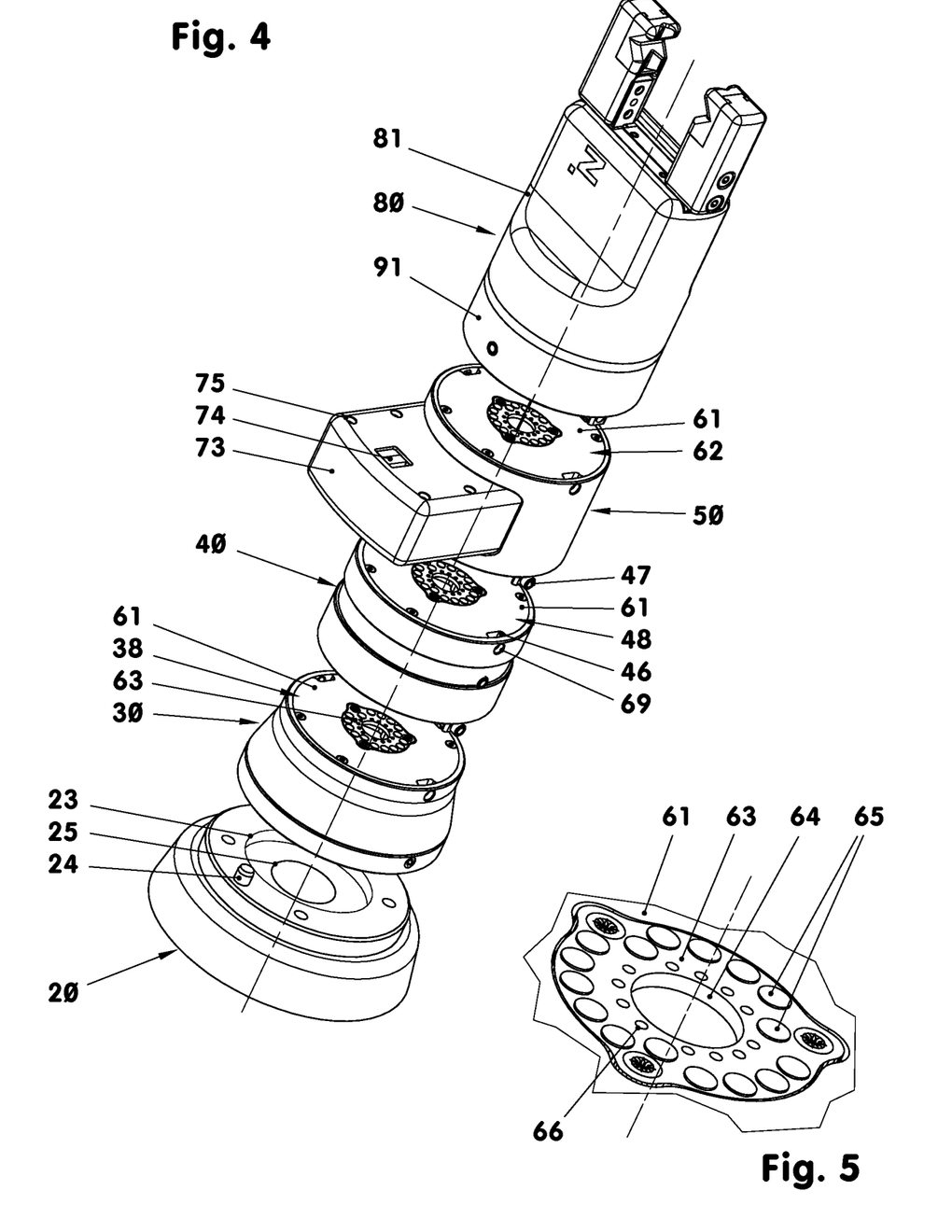
FIG. 4 is a perspective exploded view of the adapter system together with the gripper according to FIG. 1 obliquely from below.
FIG. 5 is an enlarged view of the negative adapter element of the combi-interface.

In accordance with FIG. 4, an essentially round, for example central, cover (61) is inserted in the lower side of the connection module (30), in the center of which a platelet carrier plate (63) is arranged and fastened with three screws. Together with the cover (61) and the platelet carrier plate (63), the lower side forms a negative (or female) adapter geometry (38).

The platelet carrier plate (63) is shown separately in FIG. 5. Thereby, it sits in the recess in its cover (61). The platelet carrier plate (63) has a hole (64) in its center, into which the inlet pipe (60) of the respective follower module projects at a large distance. Around the hole (64), for example, 16 contact platelets (65) are arranged. Thereby, thirteen contact platelets (65) lie on a larger circle, distributed into three groups. The angular pitch of the contact platelets within each of the groups is, for example, 21 angular degrees. Three other contact platelets (65) are arranged in a manner offset towards the hole (64) due to the space required for screwing the platelet carrier plate (63). The respective upper side of the contact platelets (65) lies approximately 0.1 mm below the outer surface of the cover (61). Between the contact platelets (65) and the edge of the hole (64), there are 12 smaller solder connection holes (66) arranged in a circle.

In the hollow connection housing (30), the individual cores and strands of the cable bundle held in the cable clamp (35) are in an electrically conductive manner connected to the contact platelets (65) via, among other things, the solder connection holes (66).

In the exploded drawing, according to FIG. 2, the connection module (30) is followed by the deformation module (40). The connection of the two modules (30,40) represents the first combi-interface (39).

The deformation module (40) essentially consists of an upper housing part (41), a lower housing part (44) and an elastomer layer (43) located between them. The elastomer layer (43) represents a flexible housing wall.

The deformation module (40), for example, contains a force-torque sensor in spoke design. Such sensor consists of a square-spoked foot ring with a central disk, a head ring and four square columns. The square columns connect the disk to the head ring. A pair of strain gauges is arranged on each column and each spoke. From the elastic deformations of the columns and/or spokes, the forces and torques acting with respect to the coordinate axes can be determined via the resistance changes of the strain gauges. Thereby, the foot ring is fastened to the upper housing part (41), while the head ring is fixed to the lower housing part (44). Through a 6×8 matrix vector multiplication, the signals emitted by the sensor are converted into values for forces and torques. For this purpose, the deformation module has its own calculation engine. The calculated values are transmitted via the lines and contact points of the modules of the adapter system to the computer-storage unit of the gripper, in order to adapt the calculated values there to the lever length which—depending on the structure of the adapter system—results between the deformation module (40) and the gripper arms (89).

The deformation module (40) has a positive adapter geometry (42) in the upper housing part (41), which comes into contact with the negative adapter geometry of the module carrying the supply module (40). The lower housing part (44) has a negative adapter geometry (48) as already known from the connection module (30). A large part of the contacts of the positive adapter geometry (42) is looped through to the contact platelets of the negative adapter geometry (48).

The deformation module (40) is followed by a communication module (50) according to FIGS. 2 and 4. The adapter geometries (48, 55), which are turned towards one another, of the modules (40, 50) form the second combi-interface (49).

The communication module (50) has a communication housing (51) with a cylindrical outer wall. A flat cover (54) is flush-mounted in the upper side of the communication module (50). In a sinking (59) of the cover (54), a deeper-set pin carrier plate (56) is fastened, see FIG. 3. There are 16 contact pins (57) on the essentially circular carrier plate (56). Small coil springs are integrated into the contact pins (57), which coil springs allow a contact pin stroke of a maximum of 1.5 mm. The highest points of the contact pins (57) protrude approximately 1 mm beyond the upper side of the cover (54) in the unloaded state. The distribution of the contact pins (57) on the pin carrier plate (56) corresponds to the distribution of the contact platelets (65) on the platelet carrier plate (63). The same applies to the solder connection holes (66).

The upper side of the communication housing (51), together with the cover (54) and the pin carrier plate (56), forms a positive (or male) adapter geometry (38).

The adapter geometry (38) is also used in identical design for the deformation module (40) and in the area of the upper side of the gripper (80). With this module as well, most of the contact pins (57) of the positive adapter geometry (55) are looped through to the contact platelets (65) of the negative adapter geometry (62). This means that, among other things, the power supplies are also transferred from the upper side to the lower side.

In the interior of the communication housing (51), an electronics assembly (71) is installed, for example mounted on several circuit boards (72), which is connected via the two current-carrying and signal-carrying interfaces via the adjacent module or modules to the gripper (80) and the PLC controlling the handling device (1). Since the gripper (80) has an IO-link interface on board, but the robot system uses very different field buses, an integrated "Ethernet to IO-Link" adapter is required here. The electronics assembly (71) represents an IO-link master, which, for example, operates four IO-link channels. In addition, as many Ethernet field bus protocols as possible can be set in the electronics module via firmware. It also has its own power supply unit for the internal power supply. Furthermore, an internal tap of an Ethernet port for connecting the camera (74) is also available here.

In FIGS. 2 and 4, the communication housing (51) has an at least approximately cuboid bulge (73) on the side as the camera housing. A camera (74) is housed in the bulge. Its camera lens is arranged behind a recess in the lower side of the bulge (73). The optical axis of the camera lens intersects the clamping space located between the gripper arms (89) of the gripper (80) approximately centrally. Thus, the field of view of the camera (74) covers the workpiece to be gripped and the gripper arms (89). Around the camera lens, on the lower side of the bulge (73), for example, four illumination light-emitting diodes (75) are arranged to illuminate the clamping space.

According to FIG. 2, the gripper (80) is docked to the communication module (50) as the last element in the kinematic chain. The docking station forms the third combi-interface (79).

Figure 7:
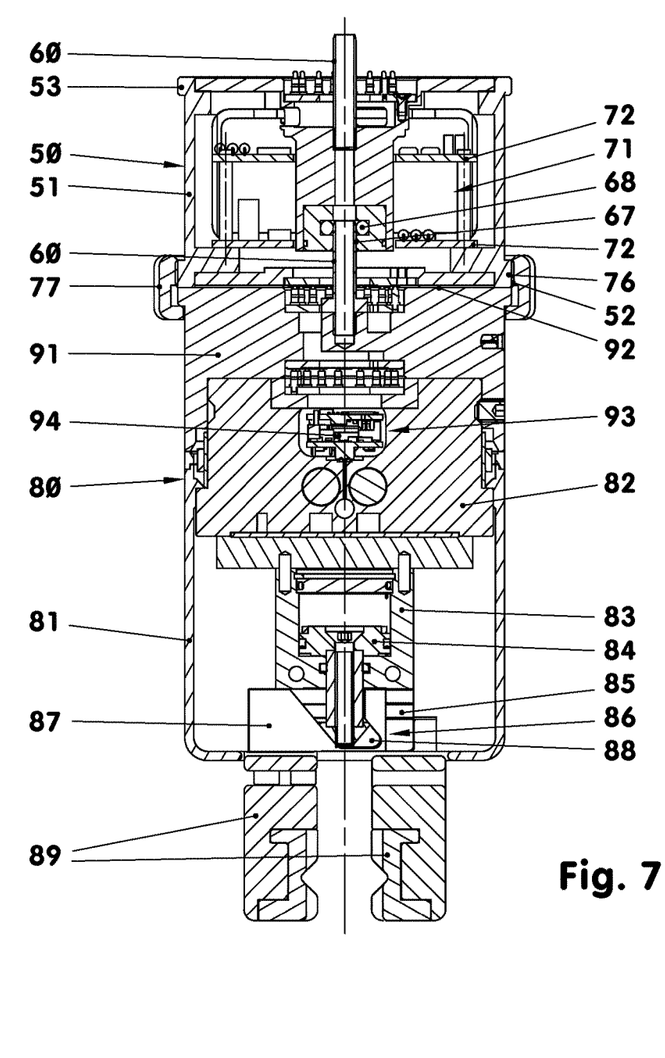
FIG. 7 is a longitudinal section to FIG. 6.

FIG. 7 shows the gripper (80) together with the communication module (50) in the longitudinal section. The gripper (80) then consists of an electronic part and a mechanical part. The gripper is fastened to the communication module (50) via the base housing (91). Thereby, a positive base adapter element (92), which is structurally comparable with the positive adapter geometries (42) and (54), is attached to the negative adapter geometry (62) of the communication module (50).

In order to be able to connect the modules (30, 40, 50) and the gripper (80) securely, easily and rapidly with one another, the module (50) and the gripper (80) are mechanically coupled via a bayonet lock in FIG. 7. For this purpose, several bayonet latches (53) are arranged on the respective module housing (31, 41, 51) and on the gripper housing (81) in the edge area of the respective positive adapter geometry, see FIG. 6.

Figure 6:
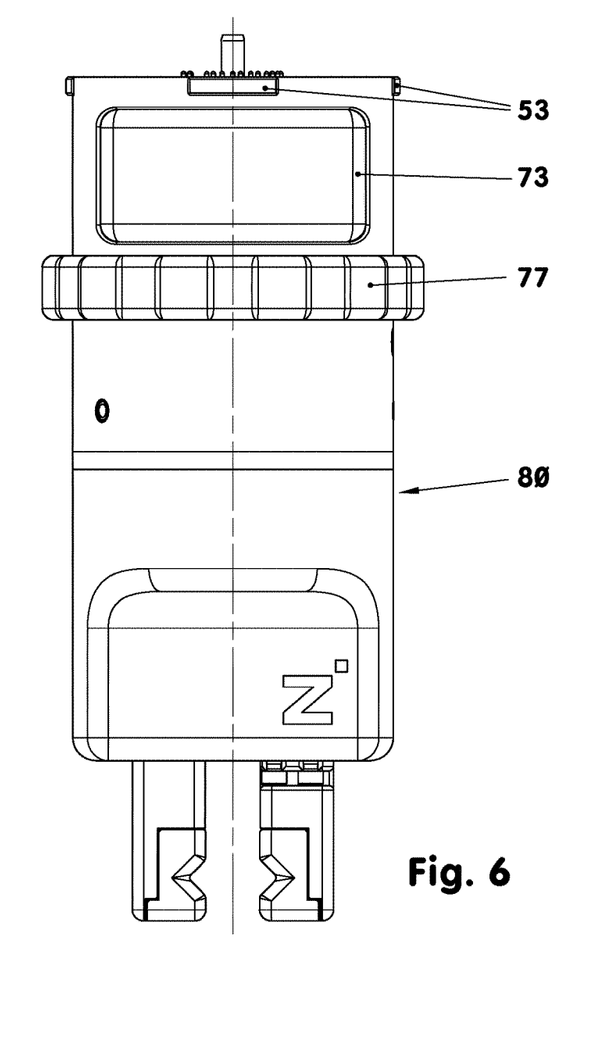
FIG. 6 is a side view of the combination of gripper and communication module.

In addition, each module housing (31, 41, 51) has a collar (76) in the edge area of the respective negative adapter geometry on the housing outer wall, into which a fine thread (82) is worked. A bayonet ring (77) is screwed onto the fine thread. On its lower side, the bayonet ring (77) has a circumferential bayonet web that has at least as many interruptions along the circumference as the module housings (31, 41, 51) have bayonet latches (53).

In order to connect the module housings (31, 41, 51) to one another, the positive and negative adapter geometries of the modules to be connected are placed against one another, wherein the bayonet latches (53) pass the interruptions of the bayonet ring (77) with clearance. By screwing on the bayonet ring (77), the bayonet web comes into radial contact with the bayonet latches (53), by which the module housings (31, 41, 51) are pulled against one another by the fine thread. In order to specify a defined holding force, the bayonet ring (77) can have a twist stop.

After the bayonet ring (77) has been tightened, the modules (30, 40, 50) and the gripper (80) are connected to one another in a dimensionally stable manner by hand—without the use of a tool. Thereby, all electrical contacts are established between the contacting adapter geometries.

When coupling according to FIGS. 6 and 7, the modules are also connected to one another pneumatically. For this purpose, an inlet pipe (60) installed in the respective positive adapter geometry is immersed in a centering manner in an inlet bore (67) arranged behind the negative adapter geometry, see FIG. 7. A sealing ring (68) is arranged in the inlet bore (67).

If necessary, the modules (30, 40, 50) along with the gripper (80) are secured against mutual rotation about the center line (16) with a locating pin/locating bore combination.

An alternative method of connecting the modules is shown in FIGS. 4 and 6. There, three lugs (46) per module protrude from the positive adapter geometries perpendicularly parallel to the center line (16), which, when the modules make contact, project into corresponding elongated-hole-shaped lug recesses (46) of the respective adjacent module. Each lug (45) has a threaded hole. In the adjacent module, there is a radial counterbore (69) in the area of each of the individual lug recesses (46). For the mutual fixing of the modules, a screw (47) is inserted into the respective counterbore (69), which is screwed tight in the respective threaded hole of the individual lug (45).

In the gripper (80), the gripper housing (81) is attached to the base housing (91), which is mounted in the base housing (91) via a carrying slide-in unit (82). The carrying slide-in unit (82) fixes the gripper housing (81) by means of an undercut engagement.

Only by way of example, a cylinder/piston unit (83, 84) is arranged in the gripper housing (81) as the adjusting drive of the gripper arms (89). The cylinder (83) of the cylinder/piston unit is fastened centrally on the carrying slide-in unit (82). At the bottom of the cylinder (83), which has an opening for the piston rod of the piston (84) guided in the cylinder (83), a guide rail (85) is arranged for guiding two carriages (87) that can be moved next to one another. Each carriage (87) carries a gripper arm (89).

The piston (84) moves the carriages (87) by means of a wedge hook gear (86). Two wedge hooks (88) are fastened to the piston rod for this purpose. One wedge hook (88) engages in each diagonally running groove of a carriage (87). With each stroke movement of the piston rod, the carriages (87) are moved with forced guidance at right angles to it. The end positions of the piston (84) can be altered using at least two sensors. If necessary, pressure sensors on the wedge hooks (88) measure the clamping forces applied to the gripper arms (89) when holding workpieces.

Furthermore, at least one pneumatic valve can be arranged in the base housing (91), in order to supply compressed air to the pressure chambers of the cylinder (83) or to blow it off under electronic control.

In place of the gripper shown in FIG. 7, grippers with an electromechanical drive are often used; see parallel gripper of DE 10 2015 012 779 A1.

A full-featured servo controller or a servo axis controller, as the case may be, together with a corresponding computer-storage module is installed in the housing of such a gripper. The servo controller is programmed at the factory so that the end user or the machine operator, as the case may be, does not need any special knowledge to adjust the gripping device to the corresponding goods to be gripped or workpieces. Thereby, the goods to be gripped can be both dimensionally stable and elastic.

In addition to the simple parameters, such as the gripping stroke and the gripping stroke supplement dependent on elasticity and gripping width, special cataloged gripping formulations for certain (for example, customer-specific) goods to be gripped can be stored in the computer-storage module, which can be called up by the machine operator via a number for the goods to be gripped. In this manner, a rapid changeover between two different known gripping tasks is possible.

For this purpose, the servo controller and the associated computer-storage module are located directly in the housing of the gripper. All values and controller settings specific to the gripping device are programmed directly into the gripper software at the manufacturer's side. The gripping formulations for new gripping tasks are taught manually by the customer's machine operator and stored directly and permanently, for example together with a new number for the goods to be gripped, in the computer-storage module on the device side. As the new number for the goods to be gripped, either the next free number is automatically selected, or it is entered numerically via the PLC input keyboard. As a rule, other set-up or teach-in procedures are also specified via such keyboard.

The data records entered by the machine operator, which are dependent on the number for the goods to be gripped, can be changed or deleted without having to intervene in the programmable logic controller on the side of the machine tool.

Optional measuring and evaluation algorithms are programmed into the gripping device's own computer-storage module, which can also measure and record environmental parameters such as housing temperature, housing vibrations, structure-borne noise, etc. during the usual gripping function. Such data is converted into wear statistics in order to determine the point in time of the next maintenance or device overhaul and to indicate when such point in time is reached, for example at the device, for example acoustically or optically. Moreover, the environmental parameters and/or their evaluation and interpretation can be transmitted from the computer-storage module via the gripping device's own data interface, that is, the communication module (50), back to the programmable logic controller of the handling device (1) or the system, as the case may be.

Two resistive force transducers, each in the form of an FSR sensor (96), are arranged on the gripper housing (81) according to FIG. 2. With the aid of such sensors, the gripper (80) can be opened or closed on site by the machine operator.

Combinations of the exemplary embodiments shown in the figures are conceivable.

LIST OF REFERENCE SIGNS

1 Handling device, articulated robot, 6-axis robot
2 Base plate
3 A-axis
4 Turntable, first element
5 3-axis
6 Foot lever
7 C-axis
8 Toggle lever
11 D-axis
12 Support arm
13 E-axis
14 Hand lever
15 Element, penultimate; turntable
16 F-axis, swivel axis, center line
19 Adapter system (sum of the modules)
20 Mechanical module, first system module
21 Base module housing
22 Square pin
23 Centering countersink
24 Centering pin
25 Through bore
29 Mechanical interface
30 Connection module, second system module
31 Connection housing, module housing
32 Centering collar
33 Locating pin bore
34 Reducing truncated cone
35 Cable clamp
36 Inlet pipe, large diameter
38 Negative adapter geometry
39 First combi-interface
40 Deformation module, fourth module
41 Upper housing part, module housing
42 Positive adapter geometry
43 Elastomer layer
44 Lower housing part
45 Lugs
46 Lug recess, elongated-hole-shaped
47 Screw
48 Negative adapter geometry
49 Second combi-interface
50 Communication module, third module
51 Communication housing, module housing
52 External thread in the area of the negative adapter geometry
53 Bayonet latches, part of the bayonet clamping system
54 Cover, top
55 Positive adapter geometry
56 Pin carrier plate
57 Contact pins, transition points for electrical energy and signals
58 Solder connection holes
59 Sinking for (56) in (51)
60 Inlet pipe, transition point for compressed air or gas
61 Cover, bottom
62 Negative adapter geometry
63 Platelet carrier plate
64 Bore, central 65 Contact platelets, transition points for electrical energy and signals
66 Solder connection holes
67 Inlet bore, transition point for compressed air or gas
68 Sealing ring
69 Counterbore for (47)
71 Electronics assembly, possibly interchangeable
72 Circuit boards, assembled
73 Bulge; camera housing, optional
74 Camera, optional
75 Illumination light-emitting diodes, optional
76 Collar with fine thread
77 Bayonet ring, notched on the outside, part of the bayonet clamping system
79 Third combi-interface, part of the bayonet clamping system
80 Element, last; gripper
81 Gripper housing
82 Carrying slide-in unit
83 Cylinder
84 Piston, pneumatic piston
85 Guide rail
86 Wedge hook gear
87 Carriage
88 Wedge hook
89 Gripper arms
91 Base housing
92 Base adapter element, positive
93 Electronics
94 Computer-storage module
96 FSR sensors

The invention claimed is:

1. An adapter system for connecting a last element (80) of a kinematic chain of a handling device (1) to the handling device (1),
  wherein the last element (80) comprises
    a computer-storage module (94) and
    at least one actuator (83, 84) and/or at least one sensor,
  wherein at least three sequentially positioned system modules (20, 30, 50) are arranged between a penultimate element (15) and the last element (80) of the kinematic chain, the at least three sequentially positioned system modules (20, 30, 50) comprising
    a first system module (20) which is a mechanical module that is mechanically adapted to the penultimate element (15) and through which electrical and/or pneumatic connection lines are led,
    a second system module (30) in which the electrical and/or pneumatic connection lines are connected to transition points (65) of a female adapter geometry (38) of a mechatronic combi-interface (39), and
    a third system module (50) which is arranged between the second system module (20) and the last element (80),
  wherein the third system module (50) has a male adapter geometry for connection to a female adapter geometry of a previous module and a female adapter geometry for connection to a male adapter geometry of a subsequent module,
  wherein the female and male adapter geometries are designed to be complementary to one another,
  wherein the female and the male adapter geometries can be connected to one another by a coupling device in a manner that is torsion-proof, captive, and dimensionally stable, and
  wherein the third system module (50) includes an electronics assembly (71) that adapts or converts communication data to be exchanged with a predefined system architecture of the incoming electrical connection lines for communication with a device interface of the last element (80), and makes the communication data available in a communicable form via corresponding transition points of the female adapter geometry.

2. The adapter system according to claim 1, wherein the last element (80) of the kinematic chain is a gripper.

3. The adapter system according to claim 2, wherein the third system module (50) has a bulge (73) on a module housing (51), in which a camera (74) for observing a space located between gripping arms (89) of the gripper is arranged.

4. The adapter system according to claim 1,
  further comprising a fourth system module (40) which is a deformation module and measures a bending of the combination of at least one of the system modules and the last element (80) in two planes perpendicular to one another,
  wherein an intersection line of the two planes is a center line (16) of the system modules (20, 30, 40, 50).

5. The adapter system according to claim 1,
  wherein the coupling device connecting the system modules (30, 40, 50) is a bayonet clamping system (53, 76, 77) in which each system module (30, 40, 50) has a screw ring (77) with rear grip webs on a first end face and radially projecting bayonet latches (53) on a second end face.

6. The adapter system according to claim 5, wherein the bayonet clamping system (53, 76, 77) is equipped with electronically monitorable end stops, which detect a clamping position.

7. The adapter system according to claim 1,
  wherein one of the at least three sequentially positioned system modules has a male adapter geometry and two or more female adapter geometries.

8. The adapter system according to claim 1,
  wherein the male adapter geometries comprise contact pins which extend towards contact platelets of the corresponding female adapter geometries.

* * * * *